(12) United States Patent
Reed et al.

(10) Patent No.: US 10,127,262 B2
(45) Date of Patent: *Nov. 13, 2018

(54) DATA SET CONNECTION MANAGER HAVING A PLURALITY OF DATA SETS TO REPRESENT ONE DATA SET

(71) Applicant: International Business Machines Corporation, Armonk, NY (US)

(72) Inventors: David C. Reed, Tucson, AZ (US); Thomas C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 641 days.

This patent is subject to a terminal disclaimer.

(21) Appl. No.: 14/178,269

(22) Filed: Feb. 11, 2014

(65) Prior Publication Data

US 2014/0164337 A1 Jun. 12, 2014

Related U.S. Application Data

(63) Continuation of application No. 13/174,789, filed on Jul. 1, 2011, now Pat. No. 8,688,635.

(51) Int. Cl.
*G06F 17/00* (2006.01)
*G06F 17/30* (2006.01)
*G06F 3/06* (2006.01)

(52) U.S. Cl.
CPC ...... *G06F 17/30371* (2013.01); *G06F 3/0617* (2013.01); *G06F 3/0652* (2013.01); *G06F 3/0673* (2013.01)

(58) Field of Classification Search
USPC .......................................... 707/616
See application file for complete search history.

(56) References Cited

U.S. PATENT DOCUMENTS

| 5,274,799 A | 12/1993 | Brant |
| 5,454,101 A | 9/1995 | Mackay et al. |
| 5,623,659 A | 4/1997 | Shi et al. |
| 5,991,753 A | 11/1999 | Wilde |
| 6,243,706 B1 | 6/2001 | Moreau et al. |

(Continued)

OTHER PUBLICATIONS

Santry, Douglas S., et al. "Deciding when to forget in the Elephant file system." ACM SIGOPS Operating Systems Review. vol. 33. No. 5. ACM, 1999.*

(Continued)

*Primary Examiner* — Mohsen Almani
(74) *Attorney, Agent, or Firm* — David W. Victor; Konrad Raynes Davda & Victor LLP

(57) ABSTRACT

Provided are a computer program product, system, and method for a data set connection manager having a plurality of data sets to represent one data set. A request is processed to open a connection to a data set having members, wherein the connection is used to perform read and write requests to the members in the data set. In response to establishing the connection, establishing for the connection a primary data set having all the members; a secondary data set to which updated members in the primary data set are written; and a pending delete data set to pending delete members comprising members that are updated.

23 Claims, 9 Drawing Sheets

(56) References Cited

U.S. PATENT DOCUMENTS

| | | | |
|---|---|---|---|
| 7,103,740 B1 * | 9/2006 | Colgrove | G06F 3/0605 707/999.202 |
| 2005/0144199 A2 | 6/2005 | Hayden | |
| 2005/0210082 A1 | 9/2005 | Shutt et al. | |
| 2006/0212481 A1 | 9/2006 | Stacey et al. | |
| 2009/0157776 A1 | 6/2009 | McGarvey et al. | |
| 2011/0071986 A1 | 3/2011 | Schmidt et al. | |
| 2013/0007292 A1 | 1/2013 | Reed et al. | |

OTHER PUBLICATIONS

"z/OS Basic Skills Information Center: z/OS concepts", IBM Corporation, 2006, pp. 1-120.

Lovelace, et al., "Partitioned Data Set Extended Usage Guide", IBM Corporation, May 2005, pp. 364.

Notice Allowance dated Nov. 12, 2013, pp. 26, for U.S. Appl. No. 13/174,789, filed Jul. 1, 2011.

* cited by examiner

DATA SET CONNECTION MANAGER HAVING A PLURALITY OF DATA SETS TO REPRESENT ONE DATA SET

CROSS-REFERENCE TO RELATED APPLICATION

This application is a continuation of U.S. patent application Ser. No. 13/174,789, filed Jul. 1, 2011, which patent application is incorporated herein by reference in its entirety.

BACKGROUND OF THE INVENTION

1. Field of the Invention

The present invention relates to a computer program product, system, and method for a data set connection manager having a plurality of data sets to represent one data set.

2. Description of the Related Art

A partitioned data set extended (PDSE) is a data set having an index and zero or more members. When adding new data for a new or existing member, the new data is appended sequentially to the end of the PDSE.

With PDSE data sets, members of the data set, such as extents, cannot be deleted while users are connected to the PDSE. Members that are no longer valid are marked as invalid, but not removed from the PDSE until the PDSE is closed. For instance, if a member is deleted, then the member is marked as pending delete. Further, if a write to a member is received while the member is being read, the updated member is created and added to the end of the PDSE and the older version of the member currently being read is marked as pending delete. However, the pending delete member cannot be removed until all users of the data set have released the data set to close the data set. If the data set is not released, then the data set can fill up with an increasing number of pending delete members, which are created as members are updated and deleted.

SUMMARY

Provided are a computer program product, system, and method for a data set connection manager having a plurality of data sets to represent one data set. A request is processed to open a connection to a data set having members, wherein the connection is used to perform read and write requests to the members in the data set. In response to establishing the connection, establishing for the connection a primary data set having all the members; a secondary data set to which updated members in the primary data set are written; and a pending delete data set to pending delete members comprising members that are updated.

DETAILED DESCRIPTION

Figure 1:
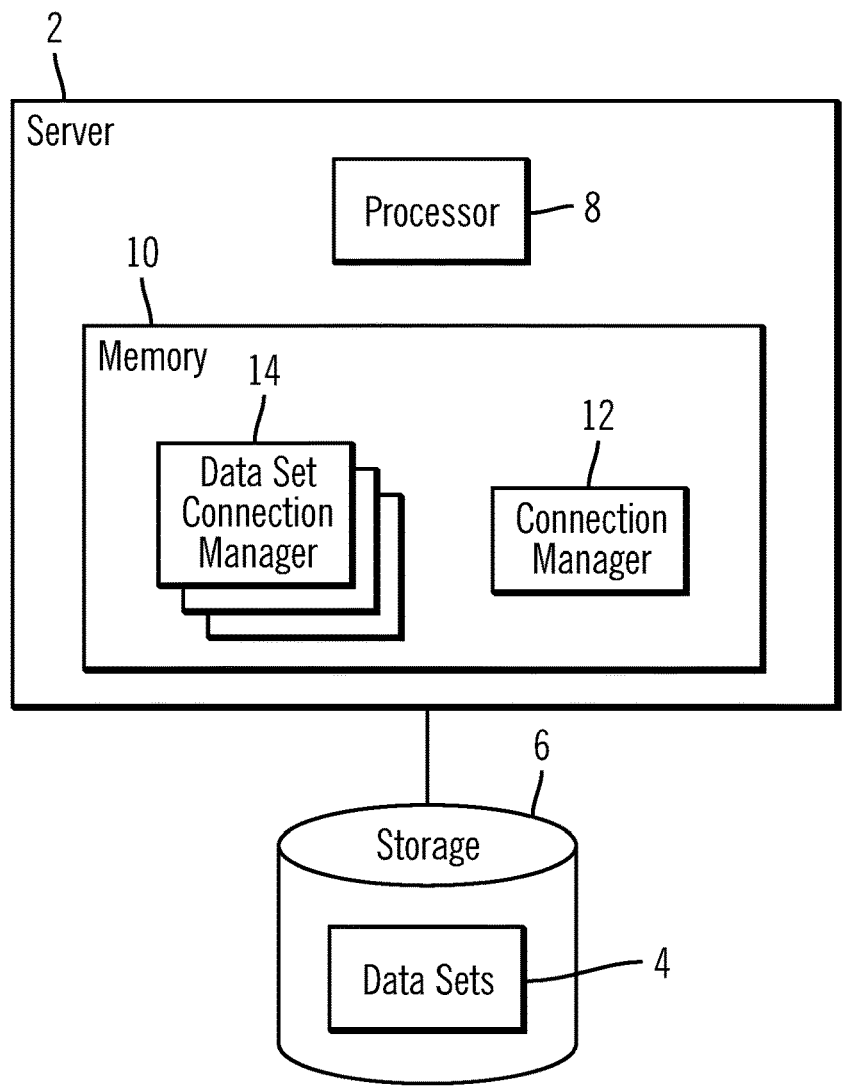
FIG. 1 illustrates an embodiment a computing environment.

FIG. 1 illustrates an embodiment of a computing environment. A plurality of hosts (not shown) may submit read and write requests to a server 2 to access data in data sets 4 in a storage 6. The server 2 includes a processor 8 and a memory 10 having a connection manager 12 program to manage read and write access to the data sets 4. The connection manager 12 creates a data set connection manager 14 for each data set that is opened and available for read and write requests, where the data set connection manager 14 includes data structures and information used to manage read and write access to the data in an underlying data set 4. There may be multiple data set connection managers 14 that have been created to represent open data sets 4.

In one embodiment, the memory 10 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc. The storages 6 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The connection manager 12 may comprise one or more programs loaded into the memory 10 that are executed by the processor 8 or may be implemented in one or more hardware devices in the server 2, such as in Application Specific Integrated Circuits (ASIC).

Figure 2:
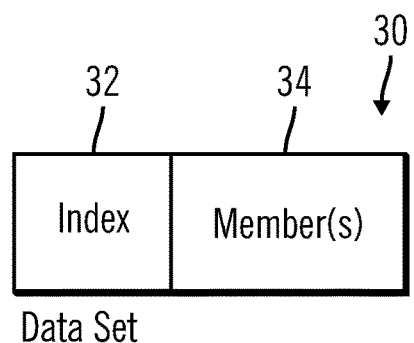
FIG. 2 illustrates a data set as known in the prior art.

FIG. 2 illustrates an embodiment of a data set 30, such as data sets 4, as known in the prior art, which includes an index 32 providing a location in the data set 30 of one or more members 32. A member comprises a range of tracks. In certain embodiments, the data set may comprise a Partitioned Data Set Extended (PDSE), where new data is written to the end of the data set and old versions of members are reused or deleted. The data set 30 may have a maximum number of members. In an alternative embodiment, the data sets 4 may comprise a type of data set other than a PDSE.

Figure 3:
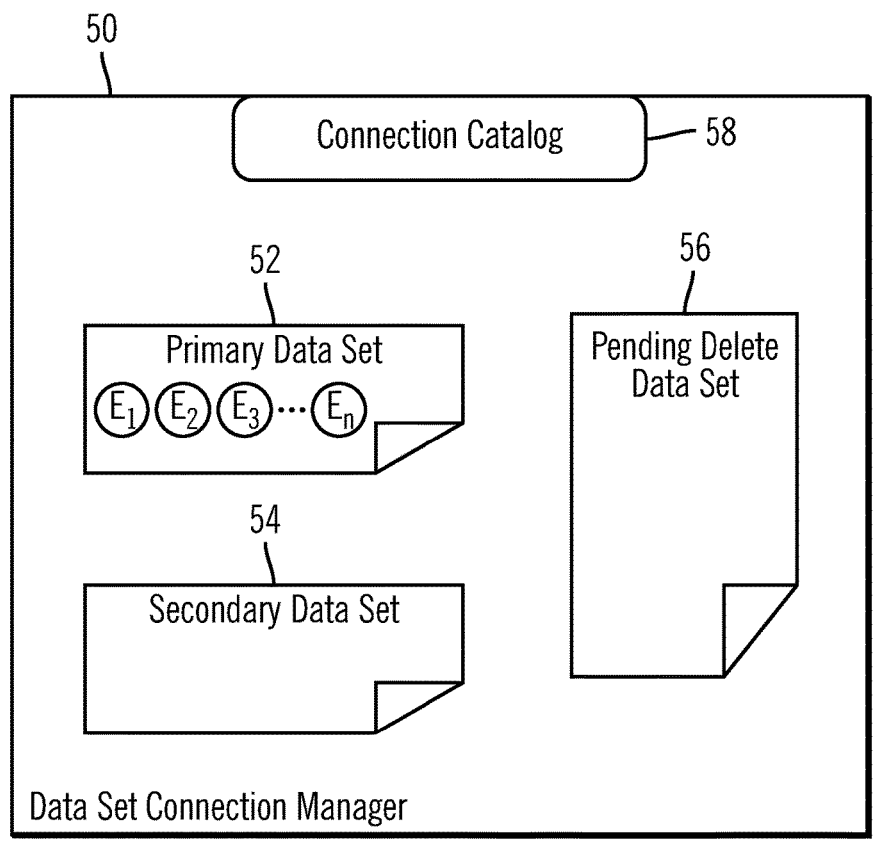
FIG. 3 illustrates an embodiment of a data set connection manager.

FIG. 3 illustrates an embodiment of a data set connection manager 50, such as the data set connection managers 14. A data set connection manager 50 that represents a connection to a member includes a primary data set 52 having the members $E_1, E_2 \ldots E_n$, a secondary data set 54 to which updated members are written, and a pending delete data 56 set having updated older versions of members that have been updated in the primary data set 52 and the secondary data set 54. Each of the data sets 52, 54, 56 may comprise a full data set 30 (FIG. 2), such as a PDSE, having an index 32 and members 34 (FIG. 2). In this way, old versions and updated members of the data set 4 that is open for read/write access exist in the different data sets 52, 54, 56. A connection catalog 58 identifies where each member is included in the different data sets 52, 54, 56 and includes information on the members. The data set connection manager 50 manages all connections to data set members for read and writes and uses the connection catalog 58 to direct read and write connections to the current location of a requested member.

In one embodiment, the data sets 52, 54, and 56 may comprise a same type of data set, such as a PDSE. In alternative embodiments, the data sets 52, 54, and 56 may each comprise a different type of data set or be the same type of data set, including, but not limited to a PDSE.

In an embodiment where the data sets 52, 54, and 56 have an index 32 (FIG. 2) and members being added to a data set are appended to the end of the data set, the index 32 would be updated when moving a member to the secondary 54 and pending delete 56 data sets and the index 32 would be updated when removing a member from the primary 52 or secondary 54 data sets.

Figure 4:
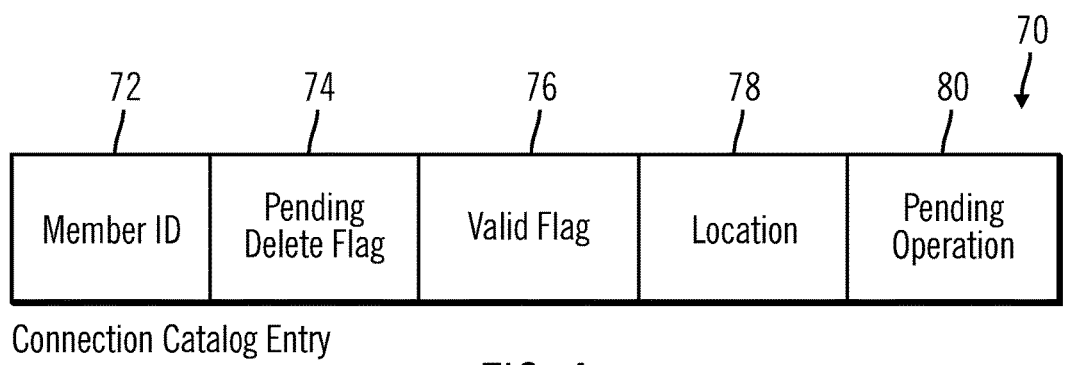
FIG. 4 illustrates an embodiment of a connection catalog entry.

FIG. 4 illustrates an embodiment of a connection catalog entry 70 in the connection catalog 58 for members in the data set connection manager 50. The entry 70 includes a member identifier (ID) 72; a pending delete flag 74 indicating whether copy of the member 72 is an older version that is pending delete; a valid flag 76 indicating if the pending delete member is valid, where a pending delete member is valid only so long as a read connection is open against the pending delete member, and invalid when the read connection is closed; a location 78 of the member indicating the data set 52, 54, 56 in which the identified member 72 is located; and any pending read and write operations 76 open against the member. In one embodiment, the location 76 may specify the data set 52, 54, 56 in which the specified version is located, and then the connection manager 12 may use the index 32 of the data set 52, 54, 56 to determine the location of the requested member in the data set 52, 54, 56. In an alternative embodiment, the location 76 may additionally specify the member location in the data set 52, 54, 56.

Figure 5:
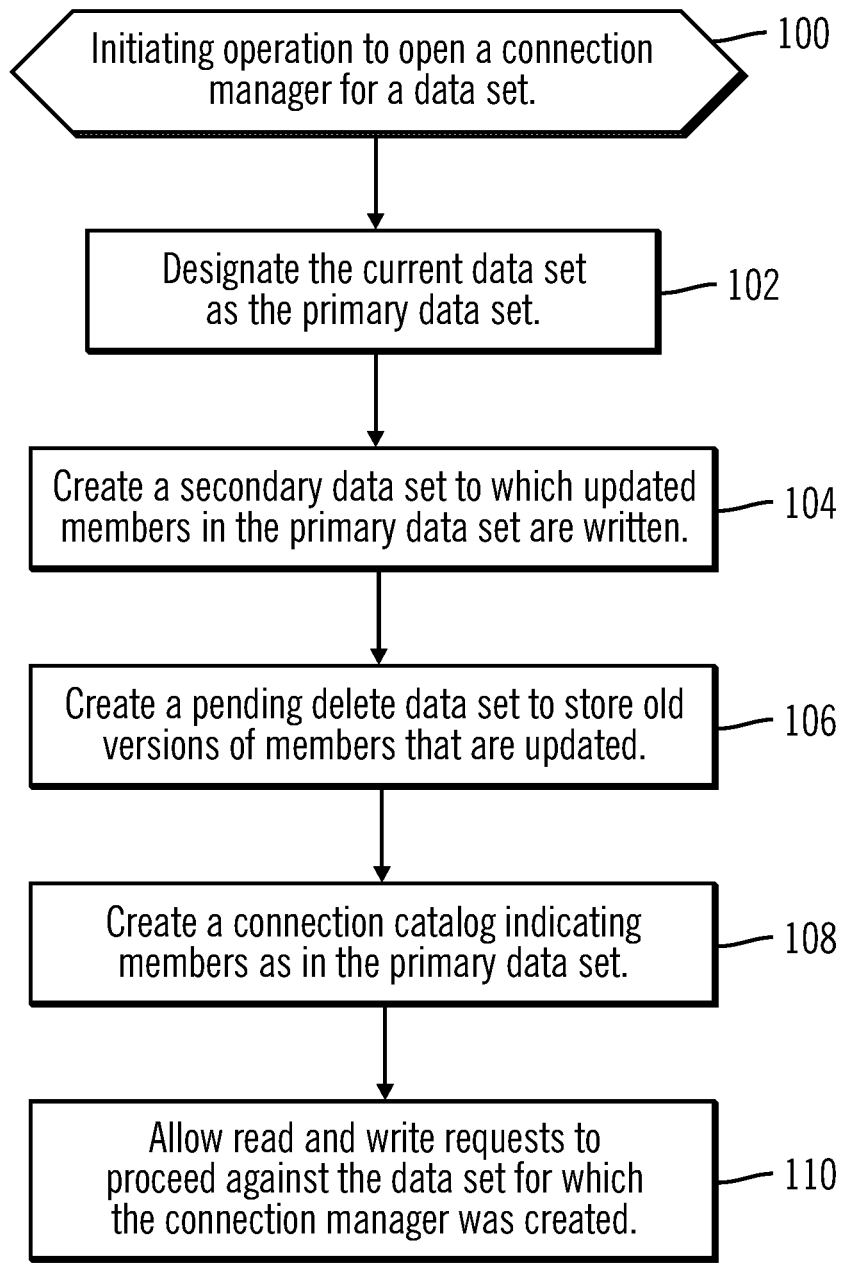
FIG. 5 illustrates an embodiment of operations to open a connection manager for a data set.

FIG. 5 illustrates an embodiment of operations performed by the connection manager 12 to open a data set connection manager 14 to represent one of the data sets 4. Upon initiating (at block 100) the open operation, the connection manager 12 designates (at block 102) the data set 4 to represent, having the members $E_1, E_2 \ldots E_n$, as the primary data set 52 An empty secondary data set 54 is created (at block 104) to which updated members in the primary data set are written when they are updated. The connection manager 12 further creates (at block 106) an empty pending delete data set 56 to store data sets that are pending delete until a read operation completes. The connection catalog 58 is created (at block 108) and includes an entry 70 for each member $E_1, E_2 \ldots E_n$ in the primary data set 52, where all the members are initially in the primary data set 52 when the data set connection manager 50 is opened and are indicated as not pending delete, i.e., the current version of the member. After opening the data set connection manager 14, the connection manager 12 allows (at block 110) read and write requests to proceed against the data set 4 by proceeding against the data sets 52, 54, 56 created in the data set connection manager 50 to represent the data set 4 that is opened.

Figure 6:
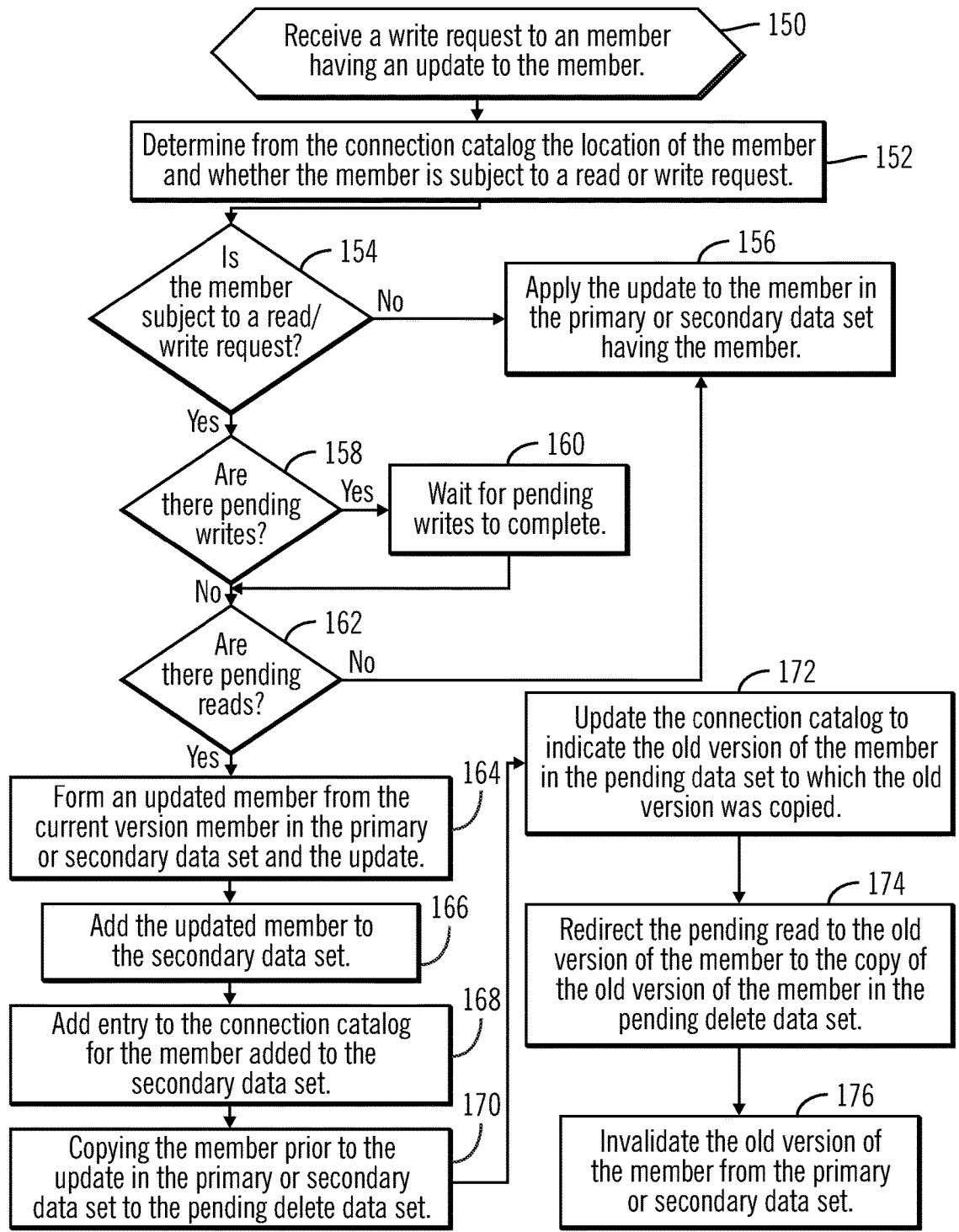
FIG. 6 illustrates an embodiment of operations to process a write request to a member.

FIG. 6 illustrates an embodiment of operations performed by the connection manager 12 to process a write request to a member with an update to the member in the data set 4 represented by the data set connection manager 50. Upon receiving the write request with the update, the connection manager 12 determines (at block 152) from the connection catalog 58 the location of the member, in the primary 52 or secondary 54 data set and from field 80 (FIG. 4) whether the member is subject to a pending read/write request. If (at block 154) the member is not subject to any pending read/write requests, then the update is applied (at block 156) to the member in the primary 52 or secondary 54 data set having the current version of the member. If (at block 158) there is a pending write request, then the connection manager 12 waits for pending writes to complete.

If there are no pending writes (from the no branch of block 158 or block 160) and if (at block 162) there are no pending reads, then control proceeds to block 156 to apply the update to the member in its current location. If (at block 162) there are pending reads, then the connection manager 12 forms (at block 164) an updated member from the current version of the member in the primary 52 or secondary 54 data set, as indicated in the connection catalog 58, and adds (at block 166) the updated member to the secondary data set 54. In certain embodiments, such as for PDSE data sets, the updated member may be written sequentially to the end of the data set 54. An entry 70 (FIG. 4) is added (at block 168) to the connection catalog 58 for the member added to the secondary data set 54, where the pending delete flag 74 would indicate the member is not a pending delete, the valid flag 76 would indicate valid, and the location 76 would indicate the secondary data set 54. Further, the index 32 (FIG. 2) of the secondary data set 54 would be updated to indicate the location in the secondary data set 54 of the added member.

The connection manager 12 further copies (at block 170) the copy of the member prior to the update in the primary 52 or secondary 54 data set, which is subject to a pending read request, to the pending delete data set 56. The connection catalog 58 is updated (at block 172) to indicate that the updated member is pending delete 74, valid 76, and the location 78 is the pending delete data set 76. The connection manager 14 may then redirect (at block 174) the pending read to the copy of the old version of the member in the pending delete data set 56. Read connections can be shifted to the copy of the member in the pending delete data set 56 when the original member in the primary data set 52 is not actively being read. The old version of the member moved to the pending delete data set 56 is invalidated (at bock 176) from the primary 52 or secondary 54 data set. The pending delete member is indicated as invalid, field 76, when the read connection on the pending delete member is closed.

With the described embodiments of FIG. 6, pending deletes do not accumulate in the primary data set 52 and are removed to the pending delete data set 56 when the member is updated to avoid the primary data set from being populated with pending delete members as members are deleted and updated.

Figure 7:
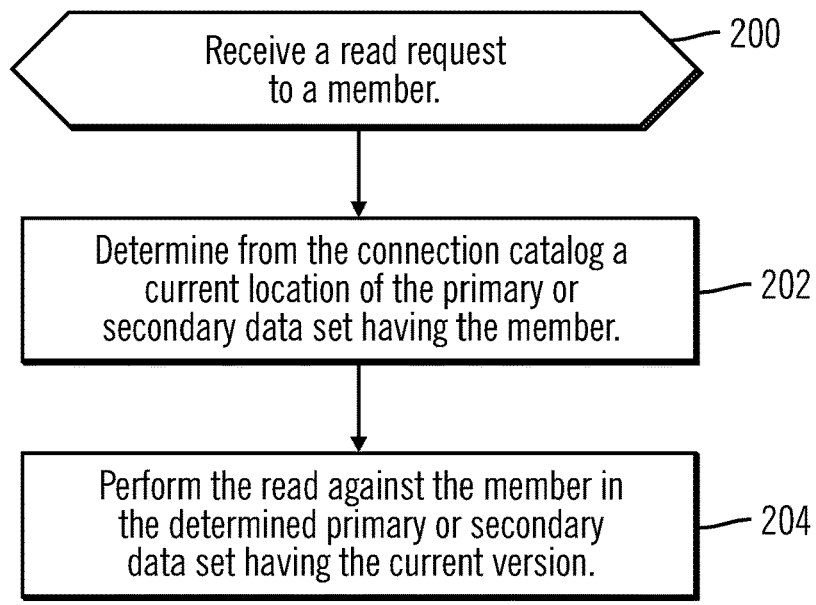
FIG. 7 illustrates an embodiment of operations process a read request to a member.

FIG. 7 illustrates an embodiment of operations performed by the connection manager 12 to process a read request to a member in a data set 4 represented by a data set connection manager 14. Upon receiving (at block 200) a read request for a data set connection manager 50, the connection manager 12 determines (at block 202) from the connection catalog 58 a current location 76 (FIG. 4) of the primary 52 or secondary data set 54 having the member. The read is then performed (at bock 204) against the member in the determined primary 52 or secondary 54 data set having the current version of the member. The pending operation 78 field for the current version of the member may be updated to indicate a pending read operation.

Figure 8:
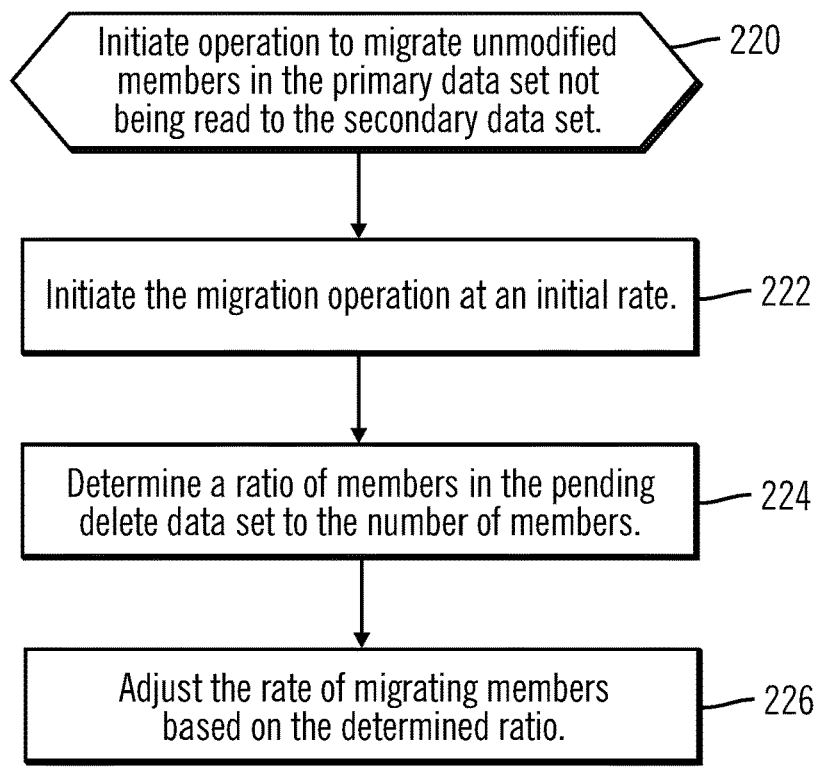
FIG. 8 illustrates an embodiment of operations to migrate unmodified members from a primary data set to a secondary data set.

FIG. 8 illustrates an embodiment of operations performed by the connection manager 12 to migrate unmodified members in the primary data set 52 not subject to any pending read or write operations, also referred to as idle members, to the secondary data set 54. Upon initiating (at block 220) the operation to migrate idle members in the primary data set 52, an operation is initiated (at block 222) to migrate idle members from the primary 52 to the secondary 54 data set at an initial transfer rate. Periodically, the connection manager 12 may determine (at block 224) a ratio of members in the pending delete data set 58 to the number of total members in the data set connection manager 50 to determine a measurement of the "dirtiness" or relative number of members that have been modified. The connection manager 12 may adjust (at block 226) the rate of transferring idle members based on the determined ratio of pending deletes, which may represent the "dirtiness" of the data sets 52 and 54. In one embodiment, the rate of migration may be increased if the ratio of pending delete members to total members reaches a higher level and may be decreased as the ratio is reduced. Pending reads or writes received while a member is being migrated from the primary 52 to the secondary 54 data set are delayed until the migration of the member is complete.

Figure 9:
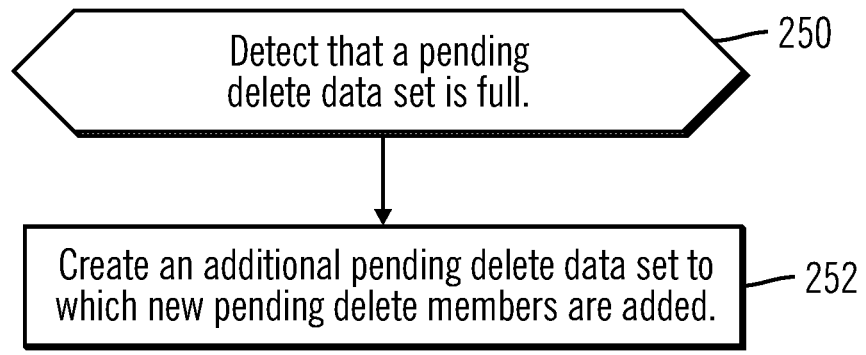
FIG. 9 illustrates an embodiment of operations to create a new pending delete data set.

FIG. 9 illustrates an embodiment of operations performed by the connection manager 12 to process a full pending delete data set 56. The pending delete data sets 56 may have a fixed upper limit on the number of pending delete members they can contain. Upon detecting (at block 250) that the currently used pending delete data set 56 is full, the connection manager 12 creates (at block 252) an additional pending delete data set 56 to which new pending delete members are added. There may be multiple pending delete data sets 56 in the data set connection manager 50 as pending delete data sets become full.

Figure 10:
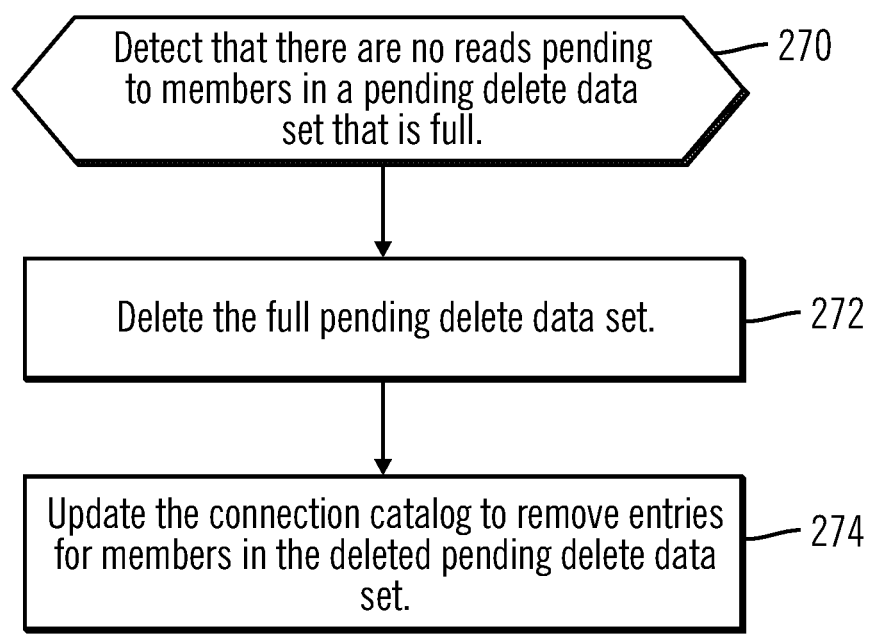
FIG. 10 illustrates an embodiment of operations to delete a pending delete data set.

FIG. 10 illustrates an embodiment of operations performed by the connection manager 12 to remove pending delete data sets 56. Upon detecting (at block 270) that there are no reads pending to pending delete members in a pending delete data set 56 that is full, the connection manager 12 deletes (at block 272) such full pending delete data set and updates (at block 274) the connection catalog 58 to remove entries for members in the deleted pending delete data set 56. In certain embodiments, pending delete members are valid only as long as they are connected for a read. As soon as the last read connection is closed to a pending delete member, the pending delete is marked invalid and no longer accessible.

Figure 11:
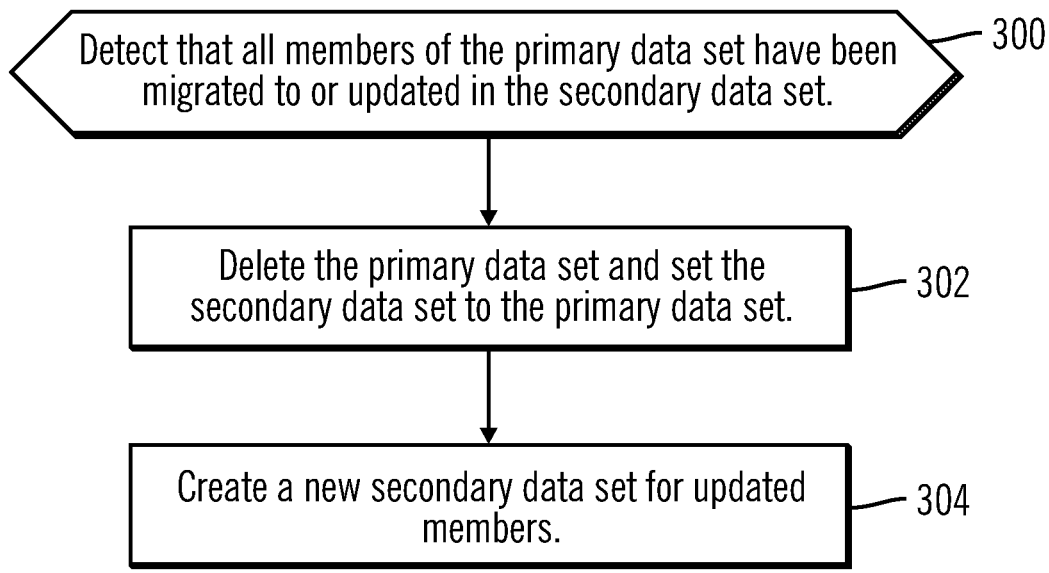
FIG. 11 illustrates an embodiment of operations to make the secondary data set the primary data set.

FIG. 11 illustrates an embodiment of operations performed by the connection manager 12 to delete the primary data set 52 and make the secondary data set 54 the primary data set. Upon detecting (at block 300) that all members of the primary data set 52 have been migrated to or updated in the secondary data set 54, i.e., all members of the primary data set 52 are represented in the secondary data set 54 and there are no outstanding connections to the primary data set 52, the connection manager 12 deletes (at block 302) the primary data set 52 and sets the secondary data set 54 to be the primary data set. A new secondary data set 54 is created (at block 304) for updated members. The pending delete data sets 56 may remain to be used as new pending deletes are created from the new primary data set 52.

Figure 12:
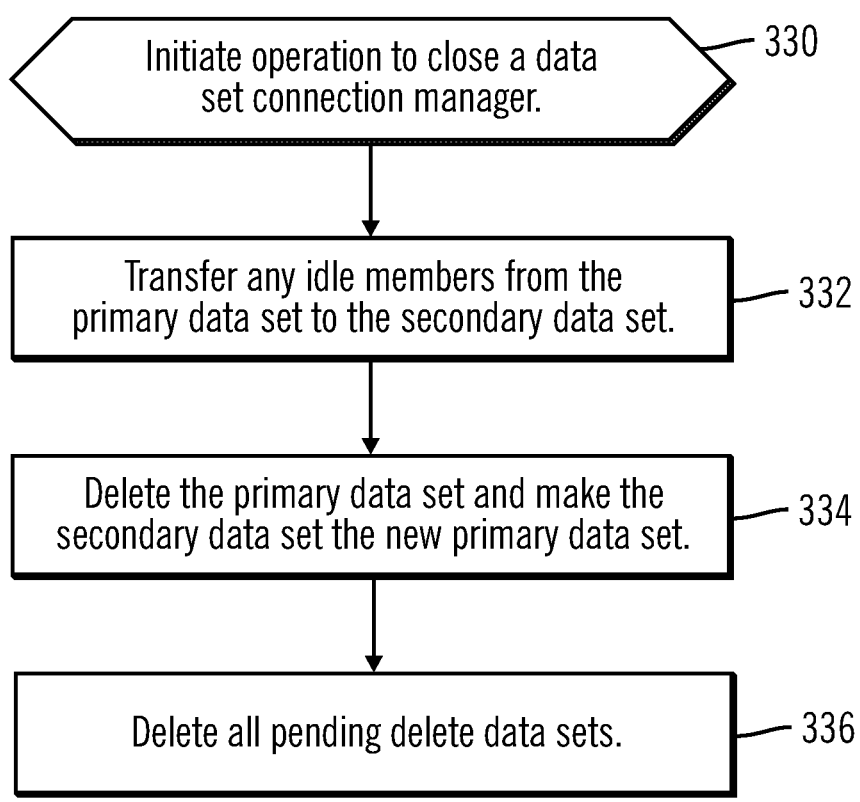
FIG. 12 illustrates an embodiment of operations to close a data set connection manager.

FIG. 12 illustrates an embodiment of operations performed by the connection manager 12 to close a data set 4 represented by a data set connection manager 14, 50. Upon initiating (at block 330) an operation to close a data set connection manager 14, 50, which may be performed in response to a close command when host applications no longer need to access the data set 4, the connection manager 12 transfers (at block 332) any idle members from the primary data set 52 to the secondary data set 54. After transferring the all idle members, the connection manager 12 deletes (at block 334) the primary data set 52 and makes the secondary data set 54 the new primary data set 52. All pending delete data sets 56 may also be deleted (at block 336).

Figure 13:
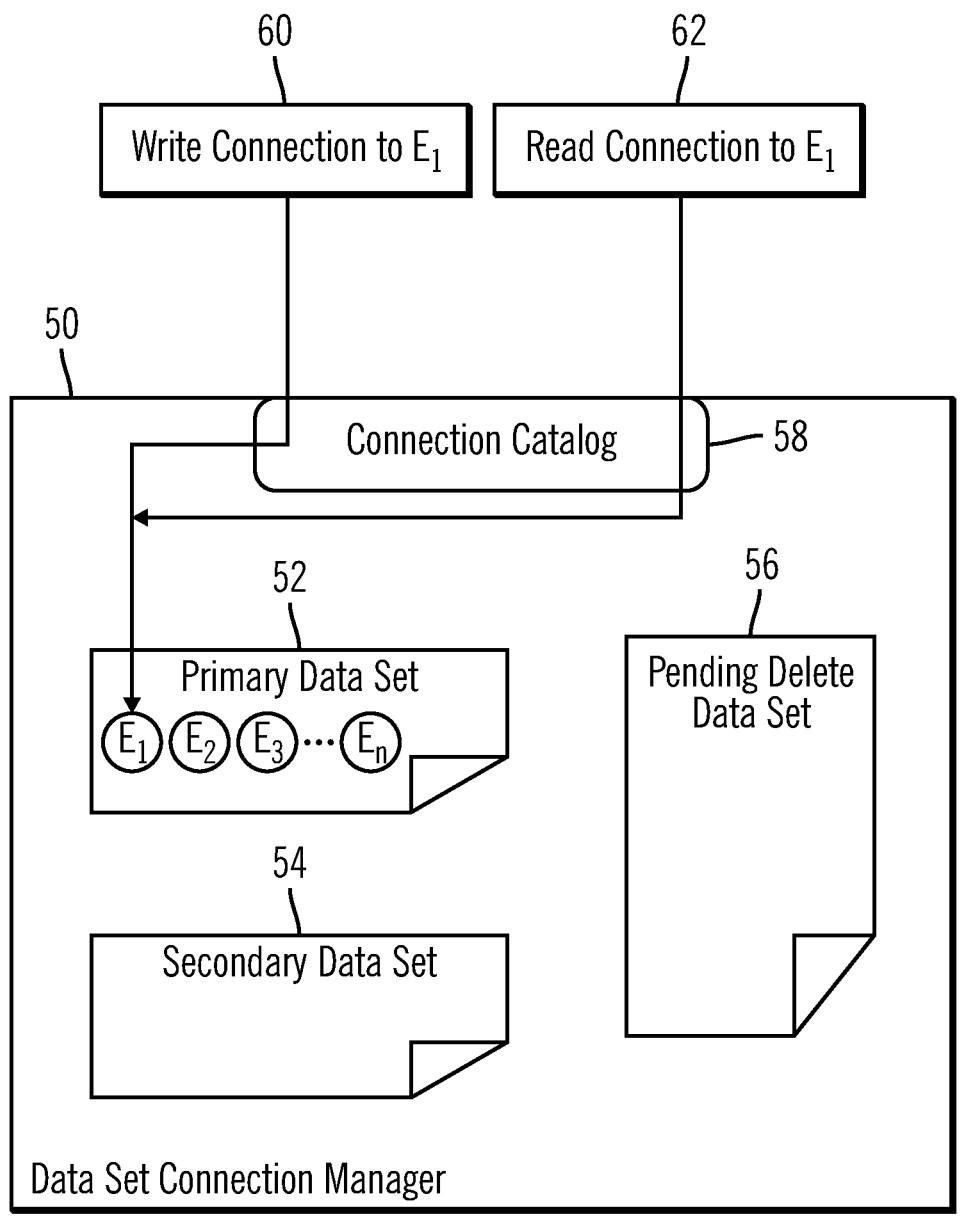
FIGS. 13 and 14 illustrate an example of read and write connections to members in a connection manager.

FIG. 13 illustrates a write connection 60 and read connection 62 directed to a same member $E_1$ in the data set connection manager 50.

Figure 14:
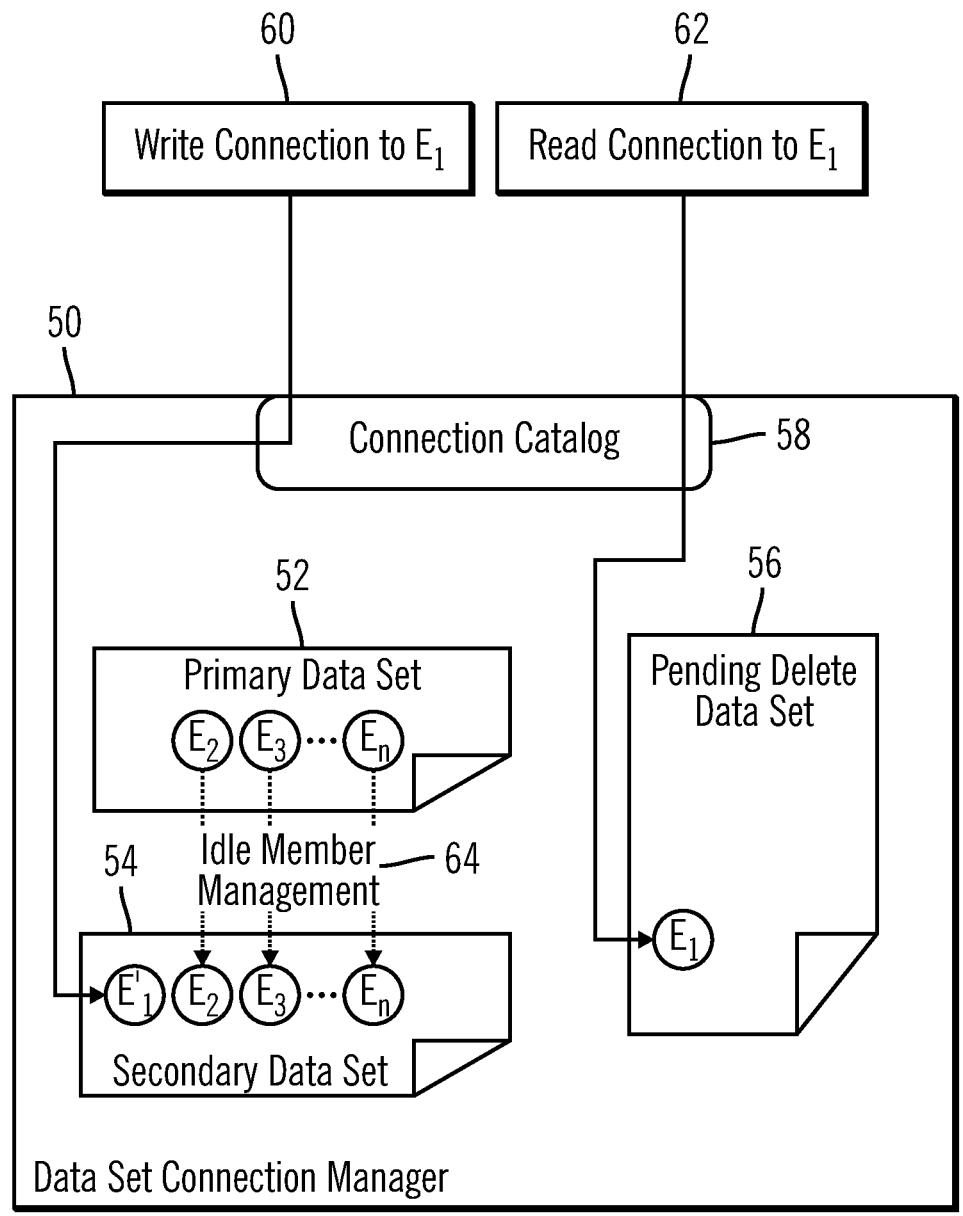

FIG. 14 illustrates the data set connection manager 50 after completing the write 60 to form an updated member $E'_1$, the updated member $E'_1$ is written to the secondary data set 54 and the older version of the member $E_1$ is moved to the pending delete data set 56, so that the pending delete older member $E'_1$ is no longer in the primary delete data set 52 consuming space therein. FIG. 14 also shows the idle member management operation 64 where unmodified and unaccessed members $E_2 \ldots E_n$ are moved from the primary data set 52 to the secondary data set 54, as described with respect to FIGS. 7 and 8.

With the described embodiments, pending delete members do not continually occupy space in the primary data set because they are moved out of the primary data set to a separate location, the pending delete data set 56. Further, space is more efficiently used in the primary data set because the data set does not remain full with pending delete data sets, and a complete data set having only current data may be more rapidly generated.

Described embodiments allow for on-line re-organization of the primary data set and elimination of pending deletes. The data set connection manager 50 serves as a wrapper for multiple internal data sets 52, 54, 56 to act as a single data set. The data set connection manager 50 is able to redirect member connections between data sets for both read and write operations, and manage the movement of members and pending deletes between data sets 52, 54, 56.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining a connection to a data set in a memory device, the computer program product comprising a non-transitory computer readable storage medium having computer readable program code embodied therein that executes to perform operations, the operations comprising:
    processing a request to open a connection to a data set having members to represent the data set in a data set connection manager in the memory device, wherein the connection is used to perform read and write requests to the members in the data set;
    initiating the open the connection to make the data set open for read/write access by establishing the data set connection manager in the memory device for the connection to have:
    a primary data set comprising the data set having all the members;
    a secondary data set to which updated members in the primary data set are written; and
    a pending delete data set to store pending delete members comprising an old version of the members prior to being updated;
    copying a member from the primary data set to the pending delete data set prior to updating the member in the primary data set, wherein the member is subject to a pending read operation;
    copying a member from the secondary data set to the pending delete data set prior to updating the member in the secondary data set, wherein the member is subject to a pending read operation; and
    using the data set connection manager to manage connections to the members of the data set for read and write operations to direct read and write connections to a requested member of the data set represented in the data set connection manager.

2. The computer program product of claim 1, wherein the operations further comprise:
    removing a member from the primary data set when the member is updated;
    migrating unchanged members not subject to a read or write operation from the primary data set to the secondary data set; and
    in response to all members in the primary data set being represented in the secondary data set, indicating the secondary data set as the primary data set and creating a new secondary data set.

3. The computer program product of claim 1, wherein the operations further comprise:
    receiving an update to a member in the primary data set subject to a read operation;
    forming an updated member from the member in the primary data set and the update;
    including the updated member in the secondary data set; and
    wherein the copying the member from the primary data set to the pending delete data set comprises moving the old version of the member in the primary data set prior to the update from the primary data set to the pending delete data set, wherein the old version of the member in the pending delete data set comprises a pending delete member.

4. The computer program product of claim 3, wherein the operations further comprise:
    redirecting the read operation being performed on the member in the primary data set to the pending delete member in the pending delete data set.

5. The computer program product of claim 3, wherein the operations further comprise:
    receiving an update to a member in the secondary data set subject to a read operation;
    forming an updated member from the member in the secondary data set and the update;
    including the updated member in the secondary data set; and
    wherein the copying the member from the secondary data set to the pending delete data set comprises moving the old version of the member in the secondary data set prior to the update from the secondary data set to the pending delete data set.

6. The computer program product of claim 1, wherein the operations further comprise:
    creating an additional pending delete data set in response to the pending delete data set becoming full.

7. The computer program product of claim 6, wherein the operations further comprise:
    determining that a full pending delete data set has no pending delete members having an open read operation; and
    deleting the full pending delete data set in response to determining that the full pending delete data set has no pending delete members having an open read operation.

8. The computer program product of claim 1, wherein the operations further comprise:
    maintaining a catalog indicating locations of members in the primary data set or the secondary data set and old versions of the members being read in the pending delete data set; and
    using the catalog to provide access to the members in the primary data set, secondary data set and pending delete data set.

9. The computer program product of claim 1, wherein the operations further comprise:
    receiving a command to close the connection to the data set;
    moving any members in the primary data set to the secondary data set;
    deleting the primary data set in response to moving all the members in the primary data set to the secondary data set;
    indicating the secondary data set as the primary data set; and
    deleting all pending delete data sets.

10. The computer program product of claim 1, wherein the primary data set, the secondary data set, and the pending delete data set each include an index and members.

11. A system for maintaining a connection to a data set, comprising:
- a processor;
- a memory device; and
- a computer readable storage medium having computer readable program code embodied therein that executes to perform operations, the operations comprising:
- processing a request to open a connection to a data set having members to represent the data set in a data set connection manager in the memory device, wherein the connection is used to perform read and write requests to the members in the data set;
- initiating the open the connection to make the data set open for read/write access by establishing the data set connection manager in the memory device for the connection to have:
- a primary data set comprising the data set having all the members;
- a secondary data set to which updated members in the primary data set are written; and
- a pending delete data set to store pending delete members comprising an old version of the members prior to being updated;
- copying a member from the primary data set to the pending delete data set prior to updating the member in the primary data set, wherein the member is subject to a pending read operation;
- copying a member from the secondary data set to the pending delete data set prior to updating the member in the secondary data set, wherein the member is subject to a pending read operation; and
- using the data set connection manager to manage connections to the members of the data set for read and write operations to direct read and write connections to a requested member of the data set represented in the data set connection manager.

12. The system of claim 11, wherein the operations further comprise:
- removing a member from the primary data set when the member is updated;
- migrating unchanged members not subject to a read or write operation from the primary data set to the secondary data set; and
- in response to all members in the primary data set being represented in the secondary data set, indicating the secondary data set as the primary data set and creating a new secondary data set.

13. The system of claim 12, wherein the operations further comprise:
- receiving a command to close the connection to the data set;
- moving any members in the primary data set to the secondary data set;
- deleting the primary data set in response to moving all the members in the primary data set to the secondary data set;
- indicating the secondary data set as the primary data set; and
- deleting all pending delete data sets.

14. The system of claim 11, wherein the operations further comprise:
- receiving an update to a member in the primary data set subject to a read operation;
- forming an updated member from the member in the primary data set and the update;
- including the updated member in the secondary data set; and
- wherein the copying the member from the primary data set to the pending delete data set comprises moving the old version of the member in the primary data set prior to the update from the primary data set to the pending delete data set, wherein the old version of the member in the pending delete data set comprises a pending delete member.

15. The system of claim 14, wherein the operations further comprise:
- redirecting the read operation being performed on the member in the primary data set to the pending delete member in the pending delete data set.

16. The system of claim 14, wherein the operations further comprise:
- receiving an update to a member in the secondary data set subject to a read operation;
- forming an updated member from the member in the secondary data set and the update;
- including the updated member in the secondary data set; and
- wherein the copying the member from the secondary data set to the pending delete data set comprises moving the old version of the member in the secondary data set prior to the update from the secondary data set to the pending delete data set.

17. The system of claim 11, wherein the primary data set, the secondary data set, and the pending delete data set each include an index and members.

18. A method for maintaining a connection to a data set, comprising
- processing a request to open a connection to a data set having members to represent the data set in a data set connection manager in a memory device, wherein the connection is used to perform read and write requests to the members in the data set;
- initiating the open the connection to make the data set open for read/write access by establishing the data set connection manager in the memory device for the connection to have:
- a primary data set comprising the data set having all the members;
- a secondary data set to which updated members in the primary data set are written; and
- a pending delete data set to store pending delete members comprising an old version of the members prior to being updated;
- copying a member from the primary data set to the pending delete data set prior to updating the member in the primary data set, wherein the member is subject to a pending read operation;
- copying a member from the secondary data set to the pending delete data set prior to updating the member in the secondary data set, wherein the member is subject to a pending read operation; and
- using the data set connection manager to manage connections to the members of the data set for read and write operations to direct read and write connections to a requested member of the data set represented in the data set connection manager.

19. The method of claim 18, further comprising:
- removing a member from the primary data set when the member is updated;
- migrating unchanged members not subject to a read or write operation from the primary data set to the secondary data set; and in response to all members in the primary data set being represented in the secondary data set, indicating the secondary data set as the primary data set and creating a new secondary data set.

20. The method of claim 18, further comprising:

receiving an update to a member in the primary data set subject to a read operation;

forming an updated member from the member in the primary data set and the update;

including the updated member in the secondary data set; and wherein the copying the member from the primary data set to the pending delete data set comprises moving the old version of the member in the primary data set prior to the update from the primary data set to the pending delete data set, wherein the old version of the member in the pending delete data set comprises a pending delete member.

21. The method of claim 20, further comprising:
redirecting the read operation being performed on the member in the primary data set to the pending delete member in the pending delete data set.

22. The method of claim 20, further comprising:

receiving an update to a member in the secondary data set subject to a read operation;

forming an updated member from the member in the secondary data set and the update;

including the updated member in the secondary data set; and wherein the copying the member from the secondary data set to the pending delete data set comprises moving the old version of the member in the secondary data set prior to the update from the secondary data set to the pending delete data set.

23. The method of claim 18, wherein the primary data set, the secondary data set, and the pending delete data set each include an index and members.

* * * * *